Patented Nov. 19, 1940

2,222,354

UNITED STATES PATENT OFFICE 2,222,354

VULCANIZATION OF RUBBER

Joy G. Lichty, Stow, Ohio, assignor to Wingfoot Corporation, Wilmington, Del., a corporation of Delaware No Drawing. Application March 30, 1937,
Serial No. 133,823

19 Claims. (Cl. 260—787)

This invention relates to the vulcanization of rubber. More particularly, it relates to the acceleration of the vulcanization of rubber by the use of a new class of compositions of matter which are aldehyde reaction products of ammonium salts of carboxylic acids.

Many chemicals have been used heretofore as accelerators in the vulcanization of rubber. Many ammonium salts of carboxylic acids, for example, have been used in the vulcanization of rubber. Some of them are good accelerators of rubber vulcanization, but many have such weak accelerating properties that they are useless as accelerators. Others are very poor accelerators but have found use as activators for other accelerators.

It is accordingly an object of this invention to convert the ammonium salts of carboxylic acids into derivatives which are good accelerators of rubber vulcanization. Another object is to provide novel and useful compositions of matter. Still further objects are to provide an improved process of rubber vulcanization and improved rubber products. Other objects will become apparent as the description of the invention proceeds.

This invention resides in the discovery of the aldehyde reaction products of ammonium salts of carboxylic acids and of their surprisingly good accelerative power for rubber vulcanization. These reaction products are of indefinite composition and are generally low melting resins or viscous oils. The process of their preparation is simple, involving the reaction of an aldehyde with an ammonium salt of an organic carboxylic acid.

Of the aldehydes which may be employed in the practice of the invention the aliphatic aldehydes are preferred, but aromatic aldehydes may also be employed. Representative materials are formaldehyde, acetaldehyde, propionaldehyde, butyraldehyde, valeraldehyde, heptaldehyde, crotonaldehyde, acrylic aldehyde, alpha ethyl beta propyl acrolein, aldol, benzaldehyde, cuminic aldehyde, cinnamic aldehyde, tetrahydro furfuraldehyde, furfuraldehyde, naphthaldehyde, furyl acrolein, etc.

The carboxylic acids useful in the invention include acetic acid, propionic acid, butyric acid, glycollic acid, caproic acid, lauric acid, stearic acid, acrylic acid, crotonic acid, oleic acid, palmitic acid, linoleic acid, oxalic acid, succinic acid, tartaric acid, adipic acid, citric acid, maleic acid, fumar acid, benzoic acid, salicyclic acid, phthalic acid, hexahydrophthalic acid, furoic acid, and others.

Illustrative of other organic carboxylic acids which have been found valuable in the practice of the invention are the (carboxymethyl) dithiocarbamates having the formula

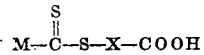

in which X is a methylene or substituted methylene group, and M is a primary or secondary amino group, such as

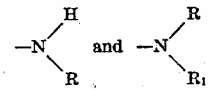

Exemplary are (carboxymethyl) N-ethyl cyclohexyl dithiocarbamate, (carboxymethyl) N-butyl tetrahydro alpha furfuryl dithiocarbamate, (carboxymethyl) diethyl dithiocarbamate, (carboxymethyl) dibutyl dithiocarbamate, (carboxymethyl) N-ethyl phenyl dithiocarbamate, (carboxymethyl) cyclohexyl dithiocarbamate (carboxymethyl) amyl dithiocarbamate, (carboxymethyl) phenyl dithiocarbamate, (carboxymethyl N-ethyl p-phenetidyl dithiocarbamate, (carboxymethyl) N-methyl p-methoxy cyclohexyl dithiocarbamate, (alpha carboxypropyl) dimethyl dithiocarbamate, etc.

The (carboxymethyl) xanthates may also be used to prepare the compounds of the invention. They have the general formula

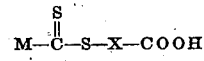

in which X is a methylene or a substituted methylene group and M is alkoxy. Illustrative examples are (carboxymethyl) butyl xanthate, (carboxymethyl) cyclohexyl xanthate, (carboxymethyl) tetrahydro furfuryl xanthate, (carboxymethyl) ethyl xanthate, (carboxymethyl) isopropyl xanthate, (carboxymethyl) amyl xanthate, (alpha carboxypropyl) butyl xanthate, etc.

Other carboxylic acids which may be used in the invention are those of the preceding formula in which M is a heterocyclic or aromatic radical, such as the (carboxymethyl) dithio furoates, (carboxymethyl) dithio benzoate and like substances.

Still other useful carboxylic acids are those having the formula R—X—COOH, in which X is a methylene or substituted methylene radical and R is aryloxy such as phenoxy, cresoxy, etc. Illustrative are phenyl glycollic acid and the tolyl and xylyl glycollic acids.

Also included in the practice of the invention are acids of the last above formula in which R represents a 2-mercaptoaryl thiazole residue

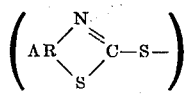

These 2-mercaptoarylthiazoles may be represented by the 2-mercaptobenzothiazoles and the 2-mercaptonaphthothiazoles. Exemplary are 2-(carboxymethylmercapto) benzothiazole, 2-(carboxymethylmercapto) 5-nitro benzothiazole, the 2-(carboxymethylmercapto) alkyl benzothiozoles, such as the 4-tolyl and 4-6 xylyl compounds, the 2-(carboxymethylmercapto) alkoxy benzothiazoles, such as 2-(carboxymethylmercapto)4-methoxy benzothiazole and 2-(carboxymethylmercapto) 6 ethoxy benzothiazole.

The ammonium salts of the invention may be formed by reacting any of the foregoing acids with ammonia or an amine. The amine may be aliphatic or aromatic, carbocyclic or heterocyclic. Although any of these amines may be used, the more basic materials are the preferred compounds. Thus, in general, the aliphatic amines are preferred over the aromatic compounds, and primary amines are preferable to secondary amines. Ordinarily, the tertiary amines are, of the broad class, the least desirable. However, they are included in the broad invention.

The preferred aliphatic amines may be straight or branched chain, or cyclic; saturated or unsaturated; carbocyclic or heterocyclic; or even aryl substituted. Thus, are included methylamine, ethylamine, isopropylamine, allylamine, the amyl primary and secondary amines, n-butyl amine, isobutyl amine, cyclohexylamine, alpha furfurylamine, alpha tetrahydrofurfuryl amine, benzylamine, beta phenethyl amine, dibenzylamine, dimethylamine, dicyclohexylamine, N-ethyl cyclohexylamine, di(tetrahydro alpha furfuryl) amine, N-butyl tetrahydro alpha furfuryl amine, ethyl methyl amine, ethylene diamine, o- or p-methyl cyclohexylamine, sym-dicyclohexyl ethylene diamine, sym-dibutyl ethylene diamine, piperidine, etc.

Other amines useful in the invention are aniline, N-methyl aniline, N-ethyl aniline, o-, m- and p-toluidine, alpha and beta naphthylamine, diamino benzenes such as o-, m- and p-phenylene diamine, hydroxylamine, phenyl hydrazine, o-, m-, and p-amino phenol, 2-4 diamino diphenyl amine, p-p' diamino diphenyl methane, o-, m-, and p-phenetidine, and m-toluylene diamine.

Ammonia or any of the amines of the invention may be combined with any of the carboxylic acids of the invention to form an organic salt which may be called an ammonium carboxylate. This salt is then reacted with an aldehyde. In general, this latter step is carried out by heating a mixture of the aldehyde and organic salt at 100° C. or higher for varying periods of time. In certain instances the time of reaction is varied from one to twelve hours with only slight variation in the products obtained. In other cases, decomposition or at least a strong exothermic reaction takes place and, consequently, the period of reaction is reduced.

The molecular ratio of aldehyde to salt employed is usually about 1.5 to 1. However, it is found in certain instances that the properties of the accelerator are improved by using as high as six mols of aldehyde to one of the salt. Effective materials may be prepared using even higher ratios. As in the case of aldehyde-amine products, the reactions are so complex, including the possible condensation of the aldehyde with itself, that the amount of aldehyde which can be used is largely limited only by the diluent effect finally encountered, whereby a given weight of the material has a lessened accelerative effect.

Following are several examples representative of the practice of the invention.

*Example 1*

A mixture of 48.7 grams of the cyclohexylamine salt of carboxy methyl benzothiazyl sulfide having the formula

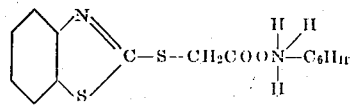

and 51.3 grams of heptaldehyde was refluxed for three hours. It was then heated to 145° C. in a beaker to remove the more volatile materials, such as water. The product was the 89.7 gram residue of yellow semi-solid material.

*Example 2*

The addition of 31.5 grams of crotonaldehyde to 54.6 grams of cyclohexyl ammonium neutral phthalate caused an exothermic reaction to take place. The reaction was controlled by cooling in an ice bath. The mixture was finally heated to 110° C. in a beaker to remove the water. The yield was 77.3 grams.

*Example 3*

A mixture of 25.7 grams of heptaldehyde and 57.5 grams of cyclohexyl ammonium stearate (a molal ratio of 1.5 to 1) was refluxed for six hours. The product set to a semi-solid on standing. The water which separated was decanted off. The yield was 82.3 grams.

*Example 4*

A mixture of 68.4 grams of heptaldehyde and 38.3 grams of cyclohexyl ammonium stearate (a molal ratio of 6 to 1) was refluxed for six hours. The reaction product was heated to 150° C. to remove the more volatile materials. The residue or final product weighed 97.7 grams.

*Example 5*

A mixture of 38.5 grams of tetrahydro alpha furfuryl ammonium stearate and 17.1 grams of heptaldehyde was refluxed for an hour and a half. The product was heated to 140° C. in an open container to remove the water. The residue was 51.9 grams of a yellow semi-solid material.

*Example 6*

Fourteen grams of crotonaldehyde were added with stirring to 60.8 grams of the piperidine salt of (carboxymethyl) pentamethylene dithiocarbamate having the formula

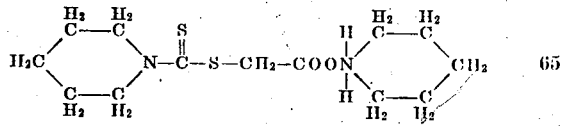

An exothermic reaction took place and the temperature rose to 65° C. The product was 72.4 grams of a dark plastic material.

*Example 7*

A mixture of 41.7 grams of the cyclohexylamine salt of (carboxymethyl) dimethyl dithio carbamate and 18.8 grams of 36% formaldehyde solution was refluxed for one hour. The water was removed by heating to 114° C. The yield of red semi-solid residue was 47 grams.

Example 8

A mixture of 14.9 grams of p-p'-diamino diphenyl methane and 26.9 grams of (carboxymethyl) dimethyl dithiocarbamate was warmed until homogeneous. To this were added 16.2 grams of butyraldehyde. The mixture was refluxed for six hours and then heated to 140° C. in the presence of a current of air to remove water. The viscous residue was 52.6 grams or 91% of the total weight of the starting materials.

Example 9

A mixture of 28.4 grams of stearic acid and 12.5 grams of polyethylene polyamines was warmed until homogeneous. To this were added 10.8 grams butyraldehyde. The mixture was refluxed for five hours and heated to 140° C. in the presence of a current of air to remove the water. The residue was 50.2 grams or 97% of the total weight of the starting materials.

Example 10

A mixture of 129.6 grams of the cyclohexylamine salt of 2-(carboxymethyl mercapto) benzothiazole and 42 grams of crotonaldehyde in a beaker was gradually warmed to 110° C. with stirring. The product was then heated to 140° C. in the presence of a current of air to remove the water and unchanged aldehyde. The residue was a dark red solid weighing 160.5 grams.

Example 11

The addition of 104 grams of cyclohexylamine to a suspension of 225 grams of 2-(carboxymethylmercapto) benzothiazole in 600 cc. of methyl alcohol gave an almost solid mass. This was treated with 105 grams of crotonaldehyde and heated on a hot plate with stirring to remove the alcohol. The product was finally heated to 110° C. to drive off the remainder of the more volatile products.

Example 12

The addition of 15.2 grams of tetrahydro alpha furfurylamine to a suspension of 47.3 grams of (carboxymethyl) dicyclohexyl dithiocarbamate gave a solution which was treated with 11.6 grams of crotonaldehyde. The solvent and more volatile products were removed by heating to 170° C. The yield was 72.6 grams.

Example 13

The addition of 12.8 grams of tetrahydro alpha furfurylamine to a suspension of 39.9 grams of (carboxymethyl) ditetrahydro alpha furfuryl dithiocarbamate in 75 cc. of benzene caused all the material to go into solution. The addition of 18.5 grams of crotonaldehyde gave a very viscous product. The solvent and water were removed by heating in a beaker on a hot plate finally to a temperature of 105° C. in the presence of a current of air. The yield was 70.2 grams.

Example 14

The addition with stirring of 226.5 grams of crotonal-cyclohexyl amine (freshly distilled) to a suspension of 268.5 grams of (carboxymethyl) dimethyl dithiocarbamate in 1200 cc. of benzene gave much solid material. To the mixture were added 105 grams of crotonaldehyde. The product was heated in a beaker in the presence of a current of air to remove the benzene and water. The maximum temperature was 135° C. The yield of residue was 541 grams or 90% of the total weight of starting materials.

Example 15

The exothermic reaction caused by the addition of 15.8 grams of crotonaldehyde to 57.5 grams of cyclohexylammonium stearate was controlled by cooling in a water bath. The product was finally heated in a beaker to 110° C. to remove the water. The yield was 69.8 grams.

Example 16

A mixture of 30.4 grams of ethylene di(ammonium benzoate) and 21 grams of crotonaldehyde was warmed gently to reflux temperature for ½ hour. The residue was heated to 140° C. in the presence of a current of air to remove the water. The final product was a brown, very sticky mass weighing 48.8 grams which was 95% of the total weight of starting materials.

Example 17

A mixture of 44.8 grams of (carboxy methyl) dimethyl dithiocarbamate and 12.5 grams of 60% ethylene diamine in water was warmed until it was practically homogeneous. To this 26.3 grams of crotonaldehyde were slowly added. The mixture was then refluxed for twenty minutes and heated to 140° C. in a current of air to remove the water. The yield of sticky material was 77.4 grams or 98% of the total weight of anhydrous starting materials.

Example 18

A mixture of 41.7 grams of the cyclohexylamine salt of (carboxymethyl) dimethyl dithiocarbamate and 23.9 grams of benzaldehyde was heated in a beaker at the boiling point for 20 minutes. A considerable quantity of the unchanged cyclohexylamine salt separated on standing. This was removed by stirring with benzene and filtering off the unchanged salt. The benzene was removed from the filtrate by heating to 130° C. The yield of red viscous residue was 39.5 grams.

Example 19

A mixture of 17.1 grams of heptaldehyde with a melted homogeneous mass of five grams of 60% ethylene diamine and 28.2 grams of oleic acid was refluxed for six hours. The product was heated to 140° C. in a current of air to remove the water. The residue weighed 44.8 grams which was 93% of the anhydrous starting materials.

Example 20

A mixture of 9.9 grams of p-p'-diamino diphenyl methane and 28.2 grams of oleic acid was warmed until the product was homogeneous. A 17.1 gram portion of heptaldehyde was added and the product was refluxed for six hours and heated to 140° C. in a current of air to remove the water. The yield of dark liquid was 51.2 grams which was 93% of the total weight of the starting materials.

Example 21

A mixture of 16.3 grams of 18.4% methylamine in water and 28.2 grams of oleic acid was warmed until homogeneous when 17.1 grams of heptaldehyde were added and the mixture was refluxed for six hours. The product was heated to 140° C. in a current of air to remove the water. The residue weighed 43.2 grams which was 89% of the total weight of the anhydrous starting materials.

Example 22

The addition of 9.9 grams of cyclohexylamine to 20.8 grams (carboxymethyl) butyl xanthate gave a solid salt. After adding 17.1 grams of heptaldehyde, the mixture was refluxed for four hours and heated to 140° C. in a current of air to remove the water. The yield of liquid residue was 42.7 grams or 89% of the total weight of the starting materials.

Example 23

A mixture of 97.5 grams of the cyclohexylamine salt of (carboxymethyl) dimethyl dithiocarbamate, 54 grams of crotonaldehyde and 300 cc. of benzene was refluxed for one hour in such a manner that the water could be trapped. A total of 12 cc. of water was removed. The residue was heated on a hot plate at low heat, finally to a temperature of 120° C. to remove the solvent. The yield of dark residue was 147.2 grams.

Example 24

The addition of 12.6 grams of cyclohexylamine to a suspension of 40 grams of (carboxymethyl) dicyclohexyl dithiocarbamate formed a solution from which much solid soon separated. This was treated with 17.8 grams of crotonaldehyde and refluxed for 10-15 minutes. The solvent and more volatile reaction products were removed by heating to 150° C. The yield of residue was 66.5 grams.

Example 25

The addition of 15.2 grams of tetrahydroalphafurfuryl amine to a suspension of 26.9 grams of (carboxymethyl) dimethyl dithiocarbamate in 100 cc. of benzene, caused all to go into solution. This solution was treated with 21.0 grams of crotonaldehyde. The solvent and more volatile reaction products were removed by heating to 150° C. The product decomposed in part at the last giving a vile mercaptan odor. The yield of residue was 59.4 grams.

Example 26

A mixture of 34.2 grams of the cyclohexylamine salt of (carboxymethyl) dimethyl dithiocarbamate and 28 grams of heptaldehyde was refluxed for a period of 16 hours. The water which separated was removed by heating to 130° C. in the presence of a current of air. The residue, a dark viscous liquid weighed 52.3 grams.

Example 27

A mixture of 24 grams of ethylene di(ammonium benzoate) and 27 grams of heptaldehyde was refluxed for 1½ hours. The product was heated to 140° C. in the presence of a current of air to remove the water. The residue weighed 46.7 grams which is 92% of the total weight of the starting materials.

Example 28

A mixture of 17.1 grams of heptaldehyde and 38.1 grams of cyclohexylammonium oleate was refluxed for six hours. The reaction product was heated to 140° C. in the presence of a current of air to remove the water. The yield of residue was 53.0 grams, or 96% of the total weight of starting materials.

Example 29

A mixture of 37.2 grams of the ethylene diamine salt of (carboxymethyl) pentamethylene dithiocarbamate and 25.6 grams of heptaldehyde was refluxed for six hours. The product was heated to 140° C. in the presence of a curernt of air to remove the water. The residue weighed 57.0 grams which is 91% of the total weight of the starting materials.

Example 30

A mixture of 36.9 grams of amylammonium oleates and 17.1 grams of heptaldehyde was refluxed for six hours. The product was heated to 140° C. in the presence of a current of air to remove the water. The residue weighed 48.0 grams which is 89% of the total weight of the starting materials.

Example 31

A mixture of 17.1 grams of heptaldehyde and 35.5 grams of butyl ammonium oleate was refluxed for six hours. The product was heated to 140° C. in the presence of a current of air to remove the water. The residue of red liquid was 47.7 grams, or 91% of the total weight of the starting materials.

Example 32

A mixture of 28.4 grams of stearic acid and 12.5 grams of polyethylene polyamines was warmed until homogeneous. To this were added 17.1 grams of heptaldehyde and the mixture was refluxed for five hours. The product was heated to 140° C. in the presence of a current of air to remove the water. The residue weighed 54.3 grams, or 94% of the total weight of the starting materials.

Example 33

Slight heating of a mixture of 73.8 grams of the cyclohexyl amine salt of (carboxymethyl) dimethyl dithiocarbamate and 28 grams of crotonaldehyde caused a vigorous reaction. Some product was lost due to frothing. When the reaction subsided the product set up to a brown resin. The yield was 90.7 grams.

Example 34

A mixture of 41.7 grams of cyclohexyl amine salt of (carboxymethyl) dimethyl dithiocarbamate and 16.2 grams of butyraldehyde was refluxed for sixteen hours. The more volatile products were then removed by heating in an open container at 140° C. The residue was a red liquid weighing 49.8 grams.

Example 35

A mixture of 35 grams of the cyclohexylamine salt of $\alpha\alpha'$-dicarboxy tetramethylene benzothiazyl sulphide, 11.0 grams of crotonaldehyde and 100 cc. of toluene was refluxed for four hours. The product was then gradually heated in an open vessel to 180° C. to remove the solvent and the water formed during the reaction. The yield of red brittle resin melting at 72–95° C. was 38.1 grams.

In order to test the accelerating characteristics of these materials, they were incorporated into rubber in accordance with the following formulae. Samples were then cured and tested.

Formula I

| | Parts by weight |
|---|---|
| Extracted pale crepe rubber | 100 |
| Zinc oxide | 5 |
| Sulfur | 3 |
| Stearic acid | 1.5 |
| Accelerator | 0.5 |

*Formula II*

| | Parts by weight |
|---|---|
| Pale crepe rubber | 100 |
| Zinc oxide | 5 |
| Sulfur | 3 |
| Accelerator | As indicated |

*Formula III*

| | Parts by weight |
|---|---|
| Smoked sheet rubber | 100 |
| Zinc oxide | 5 |
| Sulfur | 3 |
| Accelerator | 0.5 |

The results of the tests follow:

| Cure in minutes at °F. | Ultimate tensile in kgs./cm.² | Maximum elongation in percent | Modulus in kgs./cm.² | |
|---|---|---|---|---|
| | | | 500% | 700% |

PRODUCT OF EXAMPLE 1—FORMULA III

| | | | | |
|---|---|---|---|---|
| 20/260 | 52 | 895 | 9 | 20 |
| 30 | 113 | 810 | 18 | 63 |
| 40 | 143 | 810 | 21 | 77 |
| 60 | 193 | 730 | 39 | 160 |
| 80 | 198 | 700 | 49 | 198 |

PRODUCT OF EXAMPLE 2—FORMULA II

| | | | | |
|---|---|---|---|---|
| 20/260 | 88 | 860 | 11 | 35 |
| 40 | 118 | 805 | 18 | 64 |
| 60 | 143 | 795 | 21 | 82 |
| 80 | 167 | 795 | 24 | 95 |

PRODUCT OF EXAMPLE 3—FORMULA I

| | | | | |
|---|---|---|---|---|
| 20/260 | 26 | 950 | 5 | 9 |
| 40 | 106 | 850 | 14 | 45 |
| 60 | 165 | 750 | 30 | 123 |
| 80 | 195 | 715 | 41 | 178 |

PRODUCT OF EXAMPLE 4—FORMULA III

| | | | | |
|---|---|---|---|---|
| 10/260 | 16 | 960 | 4 | 6 |
| 15 | 30 | 960 | 4 | 9 |
| 20 | 105 | 860 | 14 | 43 |
| 30 | 150 | 790 | 25 | 88 |
| 40 | 185 | 750 | 35 | 142 |
| 60 | 210 | 690 | 56 | |

PRODUCT OF EXAMPLE 5—FORMULA III

| | | | | |
|---|---|---|---|---|
| 20/260 | 18 | 900 | 5 | 8 |
| 40 | 84 | 810 | 15 | 44 |
| 60 | 150 | 850 | 20 | 67 |
| 80 | 167 | 760 | 31 | 120 |
| 120 | 208 | 730 | 42 | 168 |

PRODUCT OF EXAMPLE 6—FORMULA I

| | | | | |
|---|---|---|---|---|
| 20/260 | No cure | No cure | No cure | No cure |
| 40 | 46 | 910 | 7 | 16 |
| 60 | 72 | 850 | 11 | 31 |
| 80 | 118 | 840 | 16 | 50 |

PRODUCT OF EXAMPLE 7—FORMULA III

| | | | | |
|---|---|---|---|---|
| 20/260 | 6 | 730 | 4 | 6 |
| 40 | 52 | 800 | 11 | 31 |
| 60 | 80 | 850 | 13 | 36 |
| 80 | 112 | 850 | 16 | 47 |

PRODUCT OF EXAMPLE 8—FORMULA III

| | | | | |
|---|---|---|---|---|
| 20/285 | 35 | 910 | 7 | 14 |
| 40 | 65 | 890 | 11 | 25 |
| 60 | 82 | 880 | 13 | 32 |
| 80 | 94 | 860 | 15 | 41 |
| 120 | 88 | 810 | 17 | 49 |

PRODUCT OF EXAMPLE 9—FORMULA III

| | | | | |
|---|---|---|---|---|
| 20/260 | 28 | 900 | 8 | 11 |
| 40 | 88 | 925 | 11 | 29 |
| 60 | 94 | 800 | 16 | 50 |
| 80 | 114 | 790 | 20 | 70 |
| 120 | 136 | 750 | 27 | 100 |

| Cure in minutes at °F. | Ultimate tensile in kgs./cm.² | Maximum elongation in percent | Modulus in kgs./cm.² | |
|---|---|---|---|---|
| | | | 500% | 700% |

PRODUCT OF EXAMPLE 10—FORMULA III

| | | | | |
|---|---|---|---|---|
| 20/260 | 24 | 920 | 6 | 9 |
| 40 | 51 | 820 | 10 | 26 |
| 60 | 82 | 870 | 11 | 32 |
| 80 | 93 | 840 | 14 | 42 |

PRODUCT OF EXAMPLE 11—FORMULA III

| | | | | |
|---|---|---|---|---|
| 20/260 | 47 | 885 | 8 | 19 |
| 40 | 86 | 860 | 12 | 35 |
| 60 | 110 | 850 | 15 | 47 |
| 80 | 112 | 800 | 19 | 63 |

PRODUCT OF EXAMPLE 12—FORMULA III

| | | | | |
|---|---|---|---|---|
| 40/260 | 38 | 960 | 6 | 11 |
| 60 | 72 | 925 | 9 | 22 |
| 80 | 81 | 900 | 10 | 27 |
| 120 | 99 | 870 | 13 | 37 |

PRODUCT OF EXAMPLE 13—FORMULA III

| | | | | |
|---|---|---|---|---|
| 20/260 | 14 | 890 | 6 | 9 |
| 40 | 60 | 870 | 10 | 26 |
| 60 | 80 | 880 | 11 | 30 |
| 80 | 96 | 875 | 13 | 37 |

PRODUCT OF EXAMPLE 14—FORMULA III

| | | | | |
|---|---|---|---|---|
| 20/260 | 67 | 870 | 11 | 29 |
| 40 | 94 | 800 | 17 | 55 |
| 60 | 117 | 770 | 23 | 80 |
| 80 | 127 | 740 | 27 | 98 |
| 120 | 157 | 740 | 33 | 124 |

PRODUCT OF EXAMPLE 15—FORMULA II

| | | | | |
|---|---|---|---|---|
| 10/260 | 104 | 920 | 11 | 32 |
| 15 | 105 | 840 | 15 | 48 |
| 20 | 128 | 830 | 18 | 62 |
| 40 | 158 | 780 | 25 | 100 |
| 60 | 174 | 730 | 35 | 147 |

PRODUCT OF EXAMPLE 16—FORMULA III

| | | | | |
|---|---|---|---|---|
| 40/285 | 29 | 900 | 5 | 11 |
| 60 | 50 | 890 | 7 | 18 |
| 80 | 70 | 900 | 9 | 24 |
| 120 | 84 | 860 | 13 | 35 |

PRODUCT OF EXAMPLE 17—FORMULA III

| | | | | |
|---|---|---|---|---|
| 40/285 | 18 | 850 | 5 | 10 |
| 60 | 34 | 850 | 7 | 17 |
| 80 | 56 | 675 | 9 | 23 |
| 120 | 73 | 850 | 13 | 32 |

PRODUCT OF EXAMPLE 18—FORMULA III

| | | | | |
|---|---|---|---|---|
| 20/285 | No cure | No cure | No cure | No cure |
| 40 | 53 | 940 | 8 | 16 |
| 60 | 86 | 890 | 12 | 31 |
| 80 | 99 | 875 | 14 | 37 |

PRODUCT OF EXAMPLE 19—FORMULA III

| | | | | |
|---|---|---|---|---|
| 20/260 | 6 | 800 | 3 | 5 |
| 40 | 48 | 930 | 7 | 17 |
| 60 | 74 | 880 | 11 | 29 |
| 80 | 117 | 850 | 16 | 53 |
| 120 | 151 | 790 | 25 | 89 |

PRODUCT OF EXAMPLE 20—FORMULA III

| | | | | |
|---|---|---|---|---|
| 20/285 | 18 | 830 | 6 | 10 |
| 40 | 63 | 910 | 10 | 22 |
| 60 | 66 | 850 | 12 | 31 |
| 80 | 92 | 860 | 13 | 37 |
| 120 | 91 | 820 | 16 | 46 |

PRODUCT OF EXAMPLE 21—FORMULA III

| Cure in minutes at °F. | Ultimate tensile in kgs./cm.² | Maximum elongation in percent | Modulus in kgs./cm.² | |
|---|---|---|---|---|
| | | | 500% | 700% |
| 40/260 | 49 | 880 | 9 | 20 |
| 60 | 91 | 890 | 12 | 33 |
| 80 | 124 | 840 | 17 | 57 |
| 120 | 164 | 780 | 28 | 105 |

PRODUCT OF EXAMPLE 22—FORMULA III

| Cure | Tensile | Elong. | 500% | 700% |
|---|---|---|---|---|
| 20/285 | 63 | 930 | 9 | 20 |
| 40 | 114 | 820 | 18 | 58 |
| 60 | 126 | 780 | 22 | 79 |
| 80 | 142 | 770 | 25 | 91 |
| 120 | 147 | 760 | 29 | 105 |

PRODUCT OF EXAMPLE 23—FORMULA III

| Cure | Tensile | Elong. | 500% | 700% |
|---|---|---|---|---|
| 20/260 | 50 | 960 | 7 | 14 |
| 40 | 97 | 860 | 14 | 39 |
| 60 | 117 | 820 | 17 | 57 |
| 80 | 123 | 810 | 19 | 65 |

PRODUCT OF EXAMPLE 24—FORMULA III

| Cure | Tensile | Elong. | 500% | 700% |
|---|---|---|---|---|
| 20/260 | 44 | 960 | 6 | 12 |
| 40 | 105 | 925 | 11 | 32 |
| 60 | 108 | 825 | 16 | 54 |
| 80 | 123 | 820 | 18 | 61 |

PRODUCT OF EXAMPLE 25—FORUMLA III

| Cure | Tensile | Elong. | 500% | 700% |
|---|---|---|---|---|
| 20/260 | 30 | 960 | 6 | 10 |
| 40 | 82 | 810 | 10 | 28 |
| 60 | 98 | 880 | 12 | 37 |
| 80 | 102 | 840 | 15 | 46 |

PRODUCT OF EXAMPLE 26—FORMULA III

| Cure | Tensile | Elong. | 500% | 700% |
|---|---|---|---|---|
| 15/260 | 17 | 850 | 5 | 9 |
| 20 | 38 | 900 | 8 | 15 |
| 40 | 130 | 800 | 20 | 71 |
| 60 | 160 | 760 | 27 | 111 |

PRODUCT OF EXAMPLE 27—FORMULA III

| Cure | Tensile | Elong. | 500% | 700% |
|---|---|---|---|---|
| 20/260 | 16 | 975 | 5 | 7 |
| 40 | 74 | 825 | 12 | 37 |
| 60 | 117 | 860 | 17 | 51 |
| 80 | 138 | 810 | 21 | 74 |
| 120 | 158 | 740 | 31 | 121 |

PRODUCT OF EXAMPLE 28—FORMULA III

| Cure | Tensile | Elong. | 500% | 700% |
|---|---|---|---|---|
| 20/260 | 55 | 940 | 7 | 17 |
| 30 | 93 | 865 | 13 | 38 |
| 40 | 131 | 790 | 22 | 79 |
| 60 | 164 | 740 | 33 | 128 |
| 80 | 186 | 690 | 50 | |

PRODUCT OF EXAMPLE 29—FORMULA III

| Cure | Tensile | Elong. | 500% | 700% |
|---|---|---|---|---|
| 20/260 | 22 | 870 | 6 | 10 |
| 40 | 79 | 870 | 13 | 35 |
| 60 | 97 | 800 | 17 | 55 |
| 80 | 128 | 790 | 23 | 80 |
| 120 | 156 | 730 | 34 | 129 |

PRODUCT OF EXAMPLE 30—FORMULA III

| Cure | Tensile | Elong. | 500% | 700% |
|---|---|---|---|---|
| 20/260 | 7 | 730 | 5 | 8 |
| 40 | 77 | 860 | 13 | 35 |
| 60 | 101 | 800 | 18 | 59 |
| 80 | 140 | 760 | 27 | 100 |
| 120 | 173 | 710 | 41 | 163 |

PRODUCT OF EXAMPLE 31—FORMULA III

| Cure | Tensile | Elong. | 500% | 700% |
|---|---|---|---|---|
| 20/260 | 23 | 930 | 5 | 9 |
| 40 | 79 | 830 | 14 | 40 |
| 60 | 111 | 780 | 20 | 68 |
| 80 | 147 | 760 | 27 | 106 |
| 120 | 180 | 710 | 41 | 169 |

PRODUCT OF EXAMPLE 32—FORMULA III

| Cure | Tensile | Elong. | 500% | 700% |
|---|---|---|---|---|
| 20/260 | 28 | 850 | 8 | 14 |
| 40 | 87 | 890 | 12 | 34 |
| 60 | 120 | 840 | 17 | 57 |
| 80 | 133 | 800 | 21 | 76 |
| 120 | 156 | 760 | 29 | 112 |

PRODUCT OF EXAMPLE 33—FORMULA I

| Cure | Tensile | Elong. | 500% | 700% |
|---|---|---|---|---|
| 10/260 | No cure | No cure | No cure | No cure |
| 20 | 24 | 725 | 9 | 21 |
| 40 | 82 | 860 | 11 | 33 |
| 60 | 110 | 840 | 16 | 48 |
| 80 | 130 | 820 | 18 | 64 |

PRODUCT OF EXAMPLE 34—FORMULA II

| Cure | Tensile | Elong. | 500% | 700% |
|---|---|---|---|---|
| 20/260 | 52 | 960 | 7 | 15 |
| 40 | 114 | 830 | 17 | 55 |
| 60 | 130 | 800 | 20 | 71 |
| 80 | 126 | 760 | 23 | 86 |

PRODUCT OF EXAMPLE 35—FORMULA II

| Cure | Tensile | Elong. | 500% | 700% |
|---|---|---|---|---|
| 10/260 | 85 | 880 | 10 | 30 |
| 20 | 103 | 805 | 16 | 56 |
| 40 | 132 | 770 | 23 | 88 |
| 60 | 152 | 750 | 28 | 112 |
| 80 | 154 | 740 | 30 | 123 |

These data demonstrate the excellent accelerating properties of the compounds whereby they give very good cures with a noteworthy absence of scorching tendencies.

Although only certain preferred forms of the invention have been described in detail, it will be apparent to those skilled in the art that various modifications may be made therein without departing from the spirit of the invention or the scope of the appended claims.

What I claim is:

1. The method of treating rubber which comprises vulcanizing it in the presence of the reaction product of an aldehyde with a material selected from the group consisting of ammonium and amine salts of a carboxylic acid.

2. The method of treating rubber which comprises vulcanizing it in the presence of the reaction product of an aldehyde with an amine salt of a carboxylic acid.

3. The method of treating rubber which comprises vulcanizing it in the presence of the reaction product of an aldehyde with an aliphatic amine salt of a carboxylic acid.

4. The method of treating rubber which comprises vulcanizing it in the presence of the reaction product of an aldehyde with a primary amine salt of a carboxylic acid.

5. The method of treating rubber which comprises vulcanizing it in the presence of the reaction product of an aliphatic aldehyde with a material selected from the group consisting of ammonium and amine salts of a carboxylic acid.

6. The method of treating rubber which comprises vulcanizing it in the presence of the reaction product of an aliphatic aldehyde with an aliphatic amine salt of a carboxylic acid.

7. The method of treating rubber which comprises vulcanizing it in the presence of the reaction product of an aldehyde with an aliphatic amine salt of a fatty acid.

8. The method of treating rubber which comprises vulcanizing it in the presence of the reaction product of an aldehyde with an aliphatic amine salt of a carboxy alkylene dithiocarbamate.

9. The method of treating rubber which comprises vulcanizing it in the presence of the reaction product of an aldehyde with an aliphatic amine salt of a carboxy alkylene benzothiazyl sulfide.

10. The reaction product of an aldehyde with a material selected from the group consisting of ammonium and amine salts of a carboxylic acid.

11. The reaction product of an aldehyde with an amine salt of a carboxylic acid.

12. The reaction product of an aldehyde with an aliphatic amine salt of a carboxylic acid.

13. The reaction product of an aliphatic aldehyde with a material selected from the group consisting of ammonium and amine salts of a carboxylic acid.

14. The reaction product of an aliphatic aldehyde with an aliphatic amine salt of a carboxylic acid.

15. The reaction product of an aldehyde with an aliphatic amine salt of a fatty acid.

16. The reaction product of an aldehyde with an aliphatic amine salt of a carboxy alkylene dithiocarbamate.

17. The reaction product of an aldehyde with an aliphatic amine salt of a carboxy alkylene benzothiazyl sulfide.

18. A rubber product which has been vulcanized in the presence of the reaction product of an aldehyde with a material selected from the group consisting of ammonium and amine salts of a carboxylic acid.

19. A rubber product which has been vulcanized in the presence of the reaction product of an aliphatic aldehyde with an aliphatic amine salt of a carboxylic acid.

JOY G. LICHTY.